United States Patent
Damron (10) Patent No.: US 6,567,975 B1
(45) Date of Patent: May 20, 2003

(54) METHOD AND APPARATUS FOR INSERTING DATA PREFETCH OPERATIONS USING DATA FLOW ANALYSIS

(75) Inventor: Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/436,464

(22) Filed: Nov. 8, 1999

(51) Int. Cl.[7] .................................................. G06F 9/45
(52) U.S. Cl. ........................ 717/155; 717/155; 717/156; 714/35
(58) Field of Search ............................. 717/155, 152, 717/156, 127, 132, 146, 131, 140, 141, 143, 154; 714/35

(56) References Cited

U.S. PATENT DOCUMENTS

| | | | |
|---|---|---|---|
| 4,589,065 A | * 5/1986 | Auslander et al. | 714/35 |
| 4,843,545 A | * 6/1989 | Kikuchi | 717/155 |
| 5,151,991 A | 9/1992 | Iwasawa et al. | 395/700 |
| 5,193,190 A | * 3/1993 | Janczyn et al. | 717/156 |
| 5,347,654 A | 9/1994 | Sabot et al. | 395/600 |
| 5,361,357 A | 11/1994 | Kionka | 395/700 |
| 5,396,627 A | * 3/1995 | Iitsuka | 717/160 |
| 5,606,698 A | * 2/1997 | Powell | 717/161 |
| 5,805,894 A | * 9/1998 | Robinson | 717/155 |
| 5,832,292 A | * 11/1998 | Nguyen et al. | 712/23 |
| 6,070,009 A | * 5/2000 | Dean et al. | 717/130 |
| 6,117,185 A | * 9/2000 | Schmidt | 717/155 |
| 6,139,199 A | * 10/2000 | Rodriguez | 717/159 |
| 6,158,045 A | * 12/2000 | You | 717/124 |
| 6,167,504 A | * 12/2000 | Damron | 712/202 |
| 6,170,998 B1 | * 1/2001 | Yamamoto et al. | 717/154 |
| 6,223,274 B1 | * 4/2001 | Catthoor et al. | 712/34 |

OTHER PUBLICATIONS

Chi et al, Compiler driven data cache prefetching for high performance computers, TENCON IEEE, pp 274–278, 1994.*
Cahoon et al, "Data flow analysis for software prefetch linked data structure in Java", IEEE, pp 280–291, 2001.*
Lim et al., "Efficient integration of compiler direcetd cache coherence and data prefetching" IEEE, pp 331–340, 2000.*
Lai et al., "Data prefetching for distributed shared memory systems", IEEE, pp 102–110, 1996.*

* cited by examiner

*Primary Examiner*—Anil Khatri
(74) *Attorney, Agent, or Firm*—Martine & Penilla, LLP (57) ABSTRACT

A software method and apparatus for inserting prefetch operations according to data flow analysis. The invention traverses program code to ascertain memory operations and associated address forming operations, and calculates the relative distance between the two operations. If the distance between the two operations is such that a prefetch operation, inserted between the two operations and, in particular to one embodiment, immediately after the address forming operation, would increase the speed of the program when executed, then the prefetch operation is inserted.

19 Claims, 4 Drawing Sheets

METHOD AND APPARATUS FOR INSERTING DATA PREFETCH OPERATIONS USING DATA FLOW ANALYSIS

BACKGROUND OF THE INVENTION

1. Field of the Invention

This invention pertains generally to software prefetching algorithms. More particularly, the invention is a software method and apparatus for inserting prefetch operations according to data flow analysis and, in particular, according to memory operations and associated address forming operations within the program code under consideration.

2. The Prior Art

Current computer systems include, among other things, a memory system and a processing unit (or processor or central processing unit (CPU)). A memory system serves as a repository of information, while the CPU accesses information from the memory system, operates on it, and stores it back.

However, it is well known that CPU clock speeds are increasing at a faster rate than memory speeds. When a processor attempts to read a memory location from the memory system, the request is "very urgent". That is, in most computer systems, the processor stalls or waits while the memory system provides the data requested to the CPU. The "latency" of the memory is the delay from when the CPU first requests data from memory until that data arrives and is available for use by the CPU.

Figure 1:
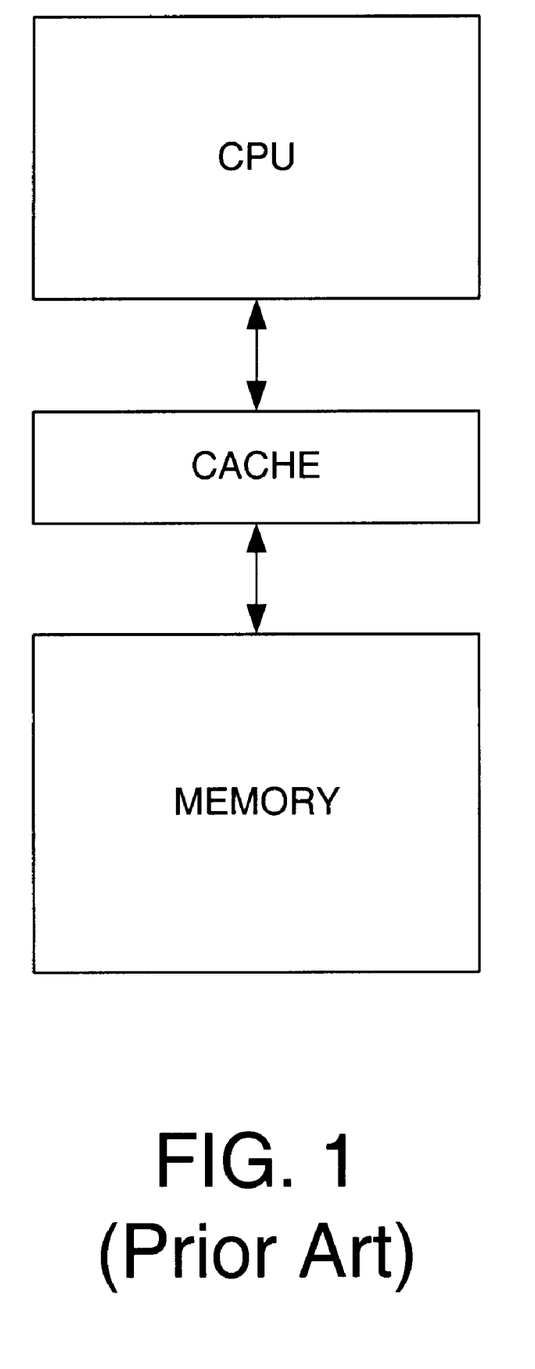
FIG. 1 is a functional block diagram depicting a conventional hierarchical memory system.

A cache is a special high-speed memory in addition to the conventional memory (or main memory). FIG. 1 depicts a conventional hierarchical memory system, where a CPU is operatively coupled to a cache, and the cache is operatively coupled to the main memory. By placing the cache (very fast memory) in front of the main memory (large, slow memory), the memory system is able to satisfy most requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache, and then to the CPU, resulting in greater latency.

To address the problem of latency and to increase the "hit" to "miss" ratio associated with cache memory, many modern computer systems have introduced instructions for prefetching data from memory to cache. For example, instructions set architectures (ISA's), such as SPARC™ V9, support software data prefetch operations. The details of the implementing prefetch operations have been left to the designers of optimizing compilers to find ways to reduce the frequency of cache misses.

One such implementation deals with reducing cache misses associated with loops structures. For example, the following sets forth a portion of code including a loop:

Loop:
Ld [R1], R2
Fadd R2, R3, R4
St R4, [R1]
Add R1, 4, R1
. . .
bcc loop

During compilation of the above code, the loop-based prefetching algorithm will recognize the loop structure and ascertain that the add instruction (Add R1, 4, R1) increments register "R1" over and over. The loop-based prefetching algorithm will also recognize that the register "R1" is used as an address location for the two memory operations ("Ld [R1], R2" and "St R4, [R1]"). From the loop structure, the loop-based prefetching algorithm determines that during the next iteration, the load instruction will be for "Ld [R1+4], R2". Thus, the loop-based prefetching algorithm may insert an instruction or operation to prefetch the value of a register for a later iteration (e.g., prefetch [R1+4]) during the current iteration, so that when the later iteration is carried out, the value at address R1+4 is in cache.

While useful for loops, the above algorithm is not particularly advantageous for programs without loops or other general purpose programs having complex indirect address references such as pointers, for example. Additionally for highly memory-intensive programs, a solution with analyzes the data flow of the program and inserts the data prefetching operations with respect to an address forming operation and an associated memory operation for the address would be would be particularly beneficial in reducing the frequency of cache misses, thereby increasing the overall speed of the program.

Accordingly, there is a need for a method and apparatus which provides for software prefetching insertion using data flow analysis. The present invention satisfies these needs, as well as others, and generally overcomes the deficiencies found in the background art.

An object of the invention is to provide a method and apparatus for inserting software prefetching operations which overcomes the deficiencies of the prior art.

Another object of the invention is to provide a method and apparatus for inserting software prefetching operations incorporates data flow analysis with respect to memory operations and address forming operations.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and apparatus embodied in software suitable for use with compilation of source code. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention also relates to a method and use of prefetch operations to load data from memory into a cache. It is contemplated that the invention may be used for loading data from conventional main memory as well as other "slow" data storage structures such as a disk storage or a network storage, for example. Although, the invention is described herein with respect to a single cache, it is contemplated that any suitable cache arrangement (e.g., various levels of cache) is within the scope of the present invention.

In its most general terms, the invention comprises software for inserting prefetch operations based the relative "distance" between an address forming operation and an associated memory operation on the address. The invention is generally used in conjunction and incorporated into compilation software (compiler), which converts source code into a compiled program (or executable file). During compilation, the source code is converted into an intermediary "program code" which is processed by the compiler. After the compiler has completed processing the program code, a compiled program is generated from the program code.

More particularly, the invention is embodied in a data flow prefetch component having a memory operation locate routine, an address forming operation locate routine, a data flow analysis routine, and a prefetch insert routine.

The memory operation locate routine carries out the operation of finding memory operations (or other prefetchable operation) within the program code under consideration. For example, the memory operation locate routine ascertains or otherwise finds each load or store operation. Each memory operation located by the memory operation locate routine is then processed by the address forming operation locate routine.

The address forming operation locate routine carries out the operation of finding an address forming code sequence associated with a memory operation. In general, for a given memory operation (or other prefetchable operation) located by the memory operation locate routine, the address forming operation locate routine performs a backward dataflow pass from the memory operation. For example, one way to form an address is to place a name of an address location into a register location. Another example of an address forming operation may include indirectly loading address location from a pointer data structure into a register location. Other conventional address forming operations are well known in the art. The address forming operation routine locates such address forming code sequences.

During the backward dataflow pass, the address forming operation routine traverses the program code from the memory operation in the opposite direction of execution flow to find the associated address forming operation.

The address forming operation locate routine further carries out the operation of determining the "distance" between the memory operation as determined by the memory operation locate routine and the associated address forming code sequence as located by the address forming operation locate routine. In an illustrative embodiment, the unit of measure or calculation for determining this distance is the number of CPU cycles (i.e., "distance") that would be carried out between the two operations. Other units of measure or calculation may also be used with the present invention to ascertain the "distance" between the memory operation and the associated address forming code sequence, such as number of instructions, memory operations, or memory operations that might miss the cache, for example.

The data flow analysis routine carries out the operation of determining whether placing a prefetch operation between the address forming operation and the associated memory operation would be "profitable". That is, whether a prefetch operation would increase the speed of execution of the program under consideration. In an illustrative embodiment, the prefetch operation is inserted immediately after the address forming operation if deemed profitable.

Several criteria may be used to determine whether inserting a prefetch would be "profitable" including whether the calculated "distance" between the address forming operation and the associated memory operation is sufficient to allow the prefetch operation to complete (i.e., load the cache with the data) before the memory operation is carried out. If so, the prefetch operation would be profitable, because the CPU is able to access the data from the cache rather having to wait for the data to be retrieved from the slower main memory (or other storage device), thereby increasing the speed of the program. Another example, may be where the distance is sufficient to allow the prefetch operation to get started (i.e., begin the process of loading of the cache) before the load operation is carried out. Here, although the cache has not completely been loaded with the requested data, the process of loading the cache has already begun, thereby reducing the CPU's wait time for the data. As another example, where the memory operation immediately follows the address forming operation, the data flow analysis routine would determine the insertion of the prefetch operation to not be profitable, because in that case, there would not be sufficient time to complete the prefetch operation before the load operation is carried out.

In analyzing whether there is sufficient time to complete the prefetch operation, other factors are taken into account including how such prefetch requests are carried out by the system, for example.

The prefetch insert routine carries out the operation of inserting the prefetch operation if the dataflow analysis routine determines that insertion of the prefetch operation would increase the speed of the program. As noted above, the prefetch operation is inserted immediately after the address forming operation in one embodiment of the invention.

However, in certain cases, where the distance between the address forming operation and the associated memory operation is sufficiently great, it would not be beneficial to place the prefetch operation immediately following the address forming operation. Since the cache is limited in size, older data must be flushed out in order to accommodate newer requests. If the prefetch operation is inserted too far away (e.g., too many CPU cycles) from the memory operation, there is a risk that the data that is prefetched may be flushed from the cache and unavailable to the memory operation. In this case, it would not be profitable to insert the prefetch operation immediately after the address forming operation. Rather, the prefetch operation is inserted at some optimal "distance" before the memory operation such that the prefetch operation is completed at the time (or just slightly before) the memory operation is carried out.

The data flow prefetch component as described above is used in conjunction with a compiler. The compiler normally includes other compilation components for carrying out other compilation tasks as is known in the art. In general, the compiler processes a program code (converted from a source code file) and generates a compiled file (or executable program). The data flow prefetch component executes during this compilation process and carries out the method of the present invention.

In operation, the invention finds a memory operation (or other prefetchable operation) in the program code under compilation. The invention then traverses the program code from the memory operation using a backward dataflow pass to find an associated address forming operation. During the backward dataflow pass, the invention estimates or otherwise calculates the distance (e.g., number of CPU cycles) between the memory operation and the associated address forming operation.

The invention then determines whether insertion of a prefetch operation after the address forming operation would be "profitable". To this end, the invention determines, among other things, whether the calculated distance is sufficient to allow a prefetch operation placed immediately after the address forming operation to complete (or alternatively, begin its processing) the prefetch sequence before the memory operation takes place. The invention also determines whether the calculated distance is such that the prefetched data may be flushed from the cache before the memory operation takes place. If deemed profitable, the prefetch operation is inserted immediately after the address forming step. Otherwise, the prefetch operation is not inserted.

In an alternative arrangement, if the invention determines that the calculated distance is such that the prefetched data may be flushed from the cache before the memory operation takes place, the prefetch operation is inserted at a calculated distance ahead (i.e., before in execution time) of the memory operation rather than immediately following the address forming operation, where the calculated distance is sufficient "far" (in CPU cycles, for example) from the memory operation to permit the prefetch operation to complete before the memory operation is carried out, but sufficient "close" (in CPU cycles) to the memory operation such that the risk that the prefetched data may be flushed is reduced.

In general, the above acts are carried out for each such memory operation within the program code under compilation.

In an alternative embodiment of the present invention, the data flow prefetch component may include an algorithm to perform instruction scheduling prior to performing the acts described above. For example, the instruction schedule routine may optimally move the memory operation and the address forming operation further apart if the two operations are too close together to permits a prefetch operation to optimize the program. Alternatively, the instruction schedule routine may optimally move the memory operation and the address forming operation closer together if the two operations are too far apart where there is a risk that a data prefetched into the cache would be flushed before the memory operation is carried, as described above.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 2:
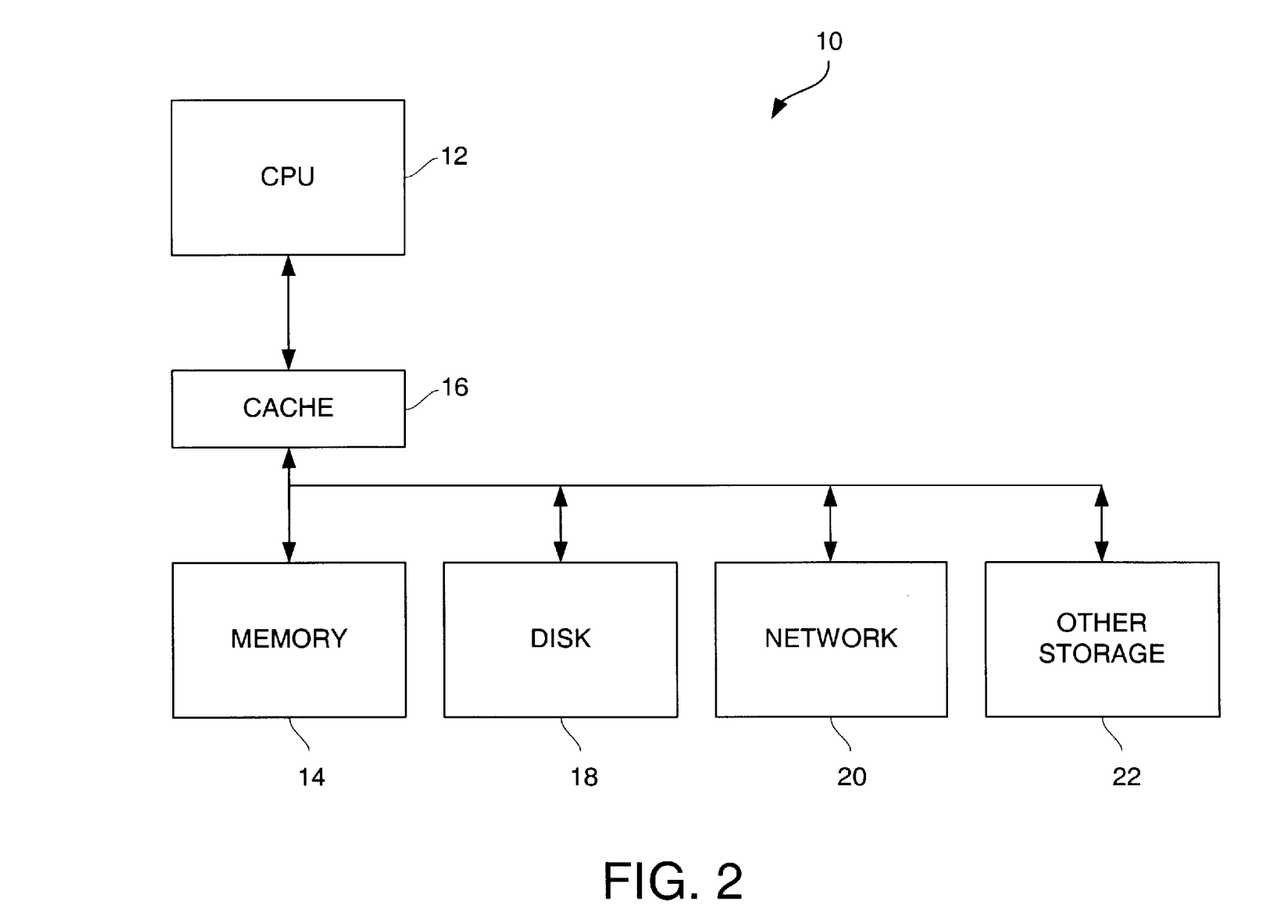
FIG. 2 is a functional block diagram depicting an illustrative hierarchical memory system suitable for use with the present invention.
Figure 3:
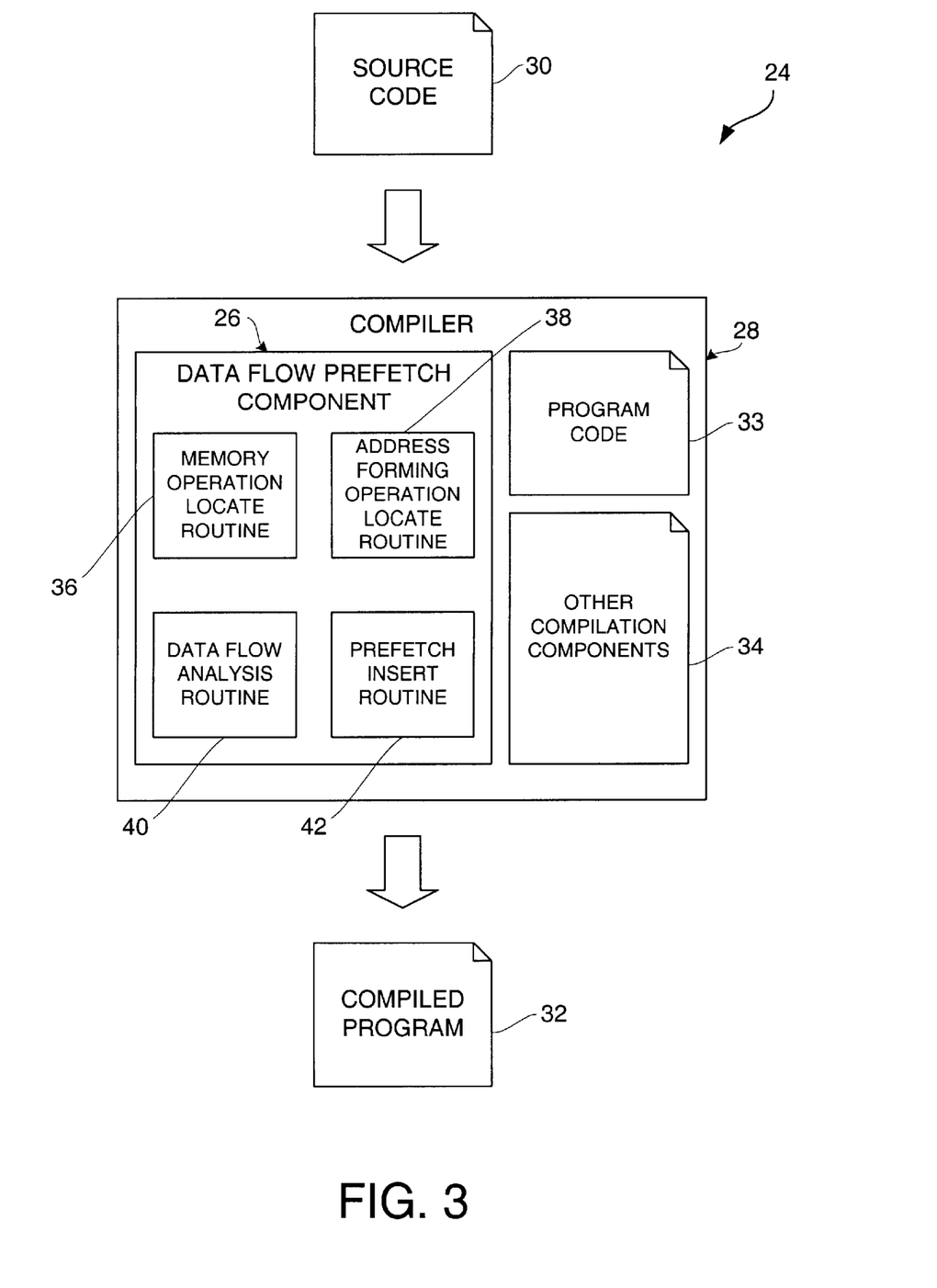
FIG. 3 is a functional block diagram depicting a compilation process using the dataflow prefetch component software of the present invention.
Figure 4:
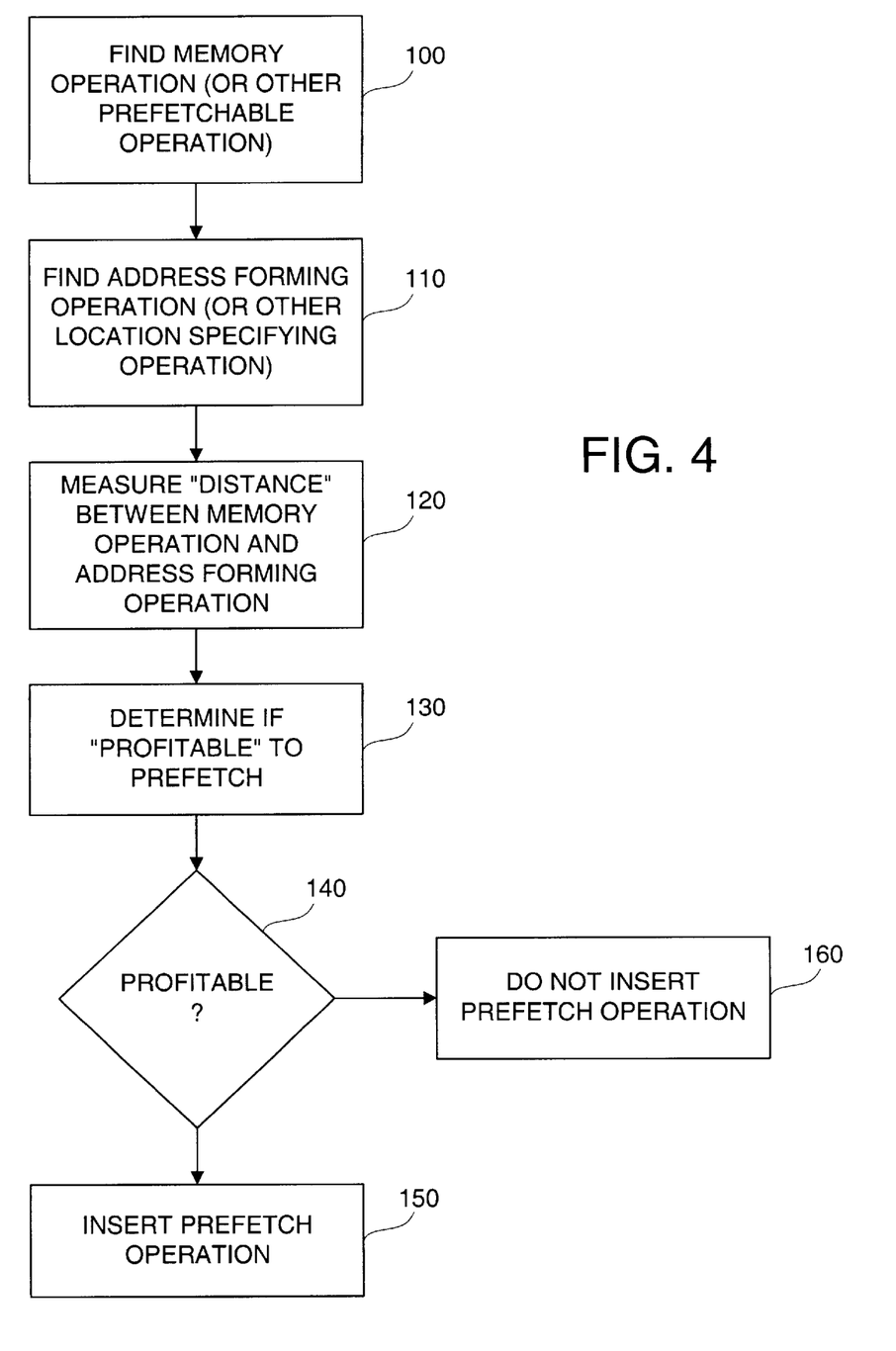
FIG. 4 is a flow chart showing generally the acts associated with method of the present invention.

Referring more specifically to the drawings, for illustrative purposes the present invention is embodied in the apparatus shown in FIG. 2 and FIG. 3 and the method outlined in FIG. 4. It will be appreciated that the apparatus may vary as to configuration and as to details of the parts, and that the method may vary as to details and the order of the acts, without departing from the basic concepts as disclosed herein. The invention is disclosed generally in terms of a method and apparatus for inserting prefetch operations during compilation, although numerous other uses for the invention will suggest themselves to persons of ordinary skill in the art.

Referring first to FIG. 2, there is generally shown a functional block diagram of an illustrative hierarchical memory system 10 suitable for use with the present invention. As described above and in further detail below in conjunction with FIG. 4, the invention inserts prefetch operations during compilation to optimize or otherwise increase the execution speed of the program under consideration.

System 10 includes a CPU 12 which carries out the execution of the program. System 10 further includes main memory 14 operatively coupled to a cache 16. The cache 16 is operatively coupled to the CPU 12 as is well known in the art. The memory 14 serves as a repository of information in the system 10. The system 10 is further structured and configured to carry out prefetches from the main memory 14 to the cache 16.

As noted above, although the invention is described herein with respect to a single cache 16, it is contemplated that any suitable cache arrangement (e.g., various levels of cache) is within the scope of the present invention. Additionally, the present invention may also be suitable for use with a system supporting prefetch operations from other storage devices into the cache 18. For example, system 10 also shows a disk store 18, a network store 20, and other store 22, each operatively coupled to the cache 16. It is contemplated that the invention may be used for prefetching data from the disk store 10, the network store 20 and/or the other store 22 into the cache in order to optimize the execution of the program.

Referring next to FIG. 3, as well as FIG. 2, there is generally shown a functional block diagram of a compilation process 24 using the dataflow prefetch component software 26 of the present invention. In general, a compiler 28 is provided to translate or convert a source code file 30 into a compiled program 32 suitable for execution by the CPU 12. During compilation, the source code 30 is converted into an intermediary program file 33 which is processed by compiler. The compiler 30 includes the dataflow prefetch component software 26 of the present invention. The compiler 30 further includes other compilation components 34 for carrying other compilation tasks as is known in the art.

The prefetch component software 26 comprises a memory operation locate routine 36, an address forming operation locate routine 38, a data flow analysis routine 40, and a prefetch insert routine 42.

The memory operation locate routine 36 finds memory operations (or other prefetchable operation) within the program code under consideration. The memory operation locate routine 36 locates each load or store operation, for example. For example, a sample load operation for a Sparc™ system may be:

ld [%o0], %o2

Each memory operation located by the memory operation locate routine 36 is then processed by the address forming operation locate routine 38.

The address forming operation locate routine 38 finds an address forming code sequence associated with the memory operation located by the memory operation locate routine 36 using a backward dataflow pass. For example, one way to form an address is to place a name of an address location into a register location. An illustrative address forming operation using a constant may be:

```
sethi %hi(sym), %o0 or %o0, %lo(sym), %o0
```

Another example of an address forming operation may include indirectly loading address location from a pointer data structure into a register location. Other conventional address forming operations are well known in the art. The address forming operation routine 38 locates such address forming code sequences.

During the backward dataflow pass, the address forming operation routine 38 traverses the program code from the memory operation in the opposite direction of execution flow to find the associated address forming operation. Various techniques may be used to traverse the program code as in known in the art.

The address forming operation locate routine 38 also determines the "distance" between the memory operation as determined by the memory operation locate routine 36 and the associated address forming code sequence as located by the address forming operation locate routine 38 during the backward dataflow pass. In an illustrative embodiment, during the backward dataflow pass described above, the address forming operation locate routine 38 determines or otherwise calculates the number of CPU cycles (i.e., "distance") between the address forming (or generation) operation and the memory operation on the address. Other units of measure or calculation may also be used with the present invention to ascertain the "distance" between the memory and the associated address forming code sequence, such as number of instructions, memory operations, or memory operations that might miss the cache, for example.

The data flow analysis routine 40 then determines whether placing a prefetch operation between the address forming operation and the associated memory operation would be "profitable". As noted above, a prefetch operation is "profitable" if it would increase the speed of execution of the program. In a first illustrative embodiment, the prefetch operation is inserted immediately after the address forming operation if deemed profitable.

Several criteria may be used to determine whether inserting a prefetch between the address forming operation and the associated memory operation would be "profitable". As noted above, one such criteria is whether the calculated "distance" between the address forming operation and the associated memory operation is sufficient to allow the prefetch operation to complete before the load operation is carried out. If so, the prefetch operation would be profitable, because the CPU 12 is able to access the data from the cache 16 rather having to wait for the data to be retrieved from the slower main memory 14 (or other storage device). Other criteria as described above, may be used to determine the profitability of such prefetch operations on a case by case basis. Other factors may be also considered including, for example, how prefetch requests are carried out by the system 10.

The prefetch insert routine 42 inserts the prefetch operation if the dataflow analysis routine 40 determines that insertion of the prefetch operation would increase the speed of the program. As noted above, the prefetch operation is normally inserted immediately after the address forming operation.

As described above, there may be cases when the distance between the address forming operation and the associated memory operation is sufficiently great (in terms of CPU cycles) that it would not be beneficial to place the prefetch operation immediately after the address forming operation. Because the cache size is limited, older data must be flushed out in order to accommodate data for more recent requests. If the prefetch operation is inserted too far away (e.g., too many CPU cycles) from the memory operation, there is a risk that the data which is prefetched may be flushed from the cache and thus unavailable during the memory operation. In this case, it would not be profitable to insert the prefetch operation immediately after the address forming operation. Rather, the prefetch operation is inserted at some optimal "distance" (in CPU cycles) before the memory operation such that the prefetch operation is completed at the time (or just slightly before) the memory operation is carried out.

The method and operation of the invention will be more fully understood by reference to the flow chart of FIG. 4, as well as FIG. 2 and FIG. 3. FIG. 4 illustrates generally the actions associated with inserting prefetch operations using data flow analysis according to the present invention. The order of operation as shown in FIG. 4 and described below are only exemplary, and should not be considered limiting.

At box 100, the memory operation locate routine 36 finds memory operations (or other prefetchable operation), such as a load or store operation, for example. In general, the acts described herein for box 110 through 160 are carried out for each memory operation located by the memory operation locate routine 36. In this way, a looping structure (not shown) may be used to iterate each memory operation. After a memory operation is located, box 10 is then carried out.

At box 110, the address forming operation locate routine 38 finds an address forming code sequence associated with the memory operation located in box 100. In carrying out this search, the address forming operation locate routine 38 performs a backward dataflow pass from the memory operation location in the program code. As noted above, a backward dataflow pass is a traversal of the program code in the opposite direction of execution flow starting from the memory operation. Box 120 is then carried out.

At box 120, the address forming operation locate routine 38 estimates the "distance" between the memory operation located from box 100 and the address forming operation located from box 110. As noted above, this "distance" may be calculated in units of CPU cycles, number of instructions, memory operations, or other suitable unit of execution time. In the illustrative embodiment described, the distance was calculated in terms of CPU cycles. Box 130 is then carried out.

At box 130, the data flow analysis routine 40 determines whether inserting the prefetch operation would be profitable. As noted above, a prefetch operation would be profitable if it would increase the speed of execution of the program. Also as described above, several criteria are used for determining this profitability. In general, the prefetch operation is inserted immediately after the address forming operation as determined from box 110. Thus, the insertion of the prefetch operation would be profitable if the distance between the address forming operation and the memory operation (calculated in box 120) are such that the prefetch operation would be complete at the time the memory operation is executed. However, if the distance between the two operations (box 100 and box 110) is too large, there may be a risk the prefetched data will be flushed from the cache, in which case the prefetch operation would not be profitable. Query 140 is then carried out.

At query 140, the data flow analysis routine 40 has determined the profitability of a prefetch. If a prefetch is determined to be profitable, then box 150 is carried out. Otherwise, box 160 is carried out.

At box 150, the data flow analysis routine 40 has determined that inserting the prefetch operation would be profitable. In this case, the prefetch insert routine 42 inserts the prefetch operation immediately after the address forming operation (determined from box 100).

At box 160, the data flow analysis routine 40 has determined that inserting the prefetch operation would not be profitable. In this case, the prefetch operation is not inserted into the program code.

In an alternative arrangement where the invention determines that the distance between the address forming operation and the associated memory operation is sufficiently great that there is a risk that the prefetch data would be flushed from the cache before the memory operation is carried out, the prefetch operation is not inserted immediately after the address forming operation, but rather the prefetch operation is inserted at some optimal "distance" before the memory operation such that the prefetch operation is completed at the time (or just slightly before) the memory operation is carried out.

Accordingly, it will be seen that this invention provides a method and apparatus for inserting prefetch operations according to data analysis of source and program code, and, in particular, based on the relative "distance" between an address forming operation and an associated memory operation on the address. Although the description above contains many specificities, these should not be construed as limiting the scope of the invention but as merely providing an illustration of the presently preferred embodiment of the invention. Thus the scope of this invention should be determined by the appended claims and their legal equivalents

What is claimed is:

1. A method for inserting prefetch operations during compilation of a program code into a program comprising:
   (a) locating a memory operation within said program code;
   (b) locating an address forming operation associated with said memory operation within said program code;
   (c) determining if insertion of a prefetch operation between said memory operation and said address forming operation would increase the speed of execution of said program; and
   (d) inserting a prefetch operation between said memory operation and said address forming operation when said act (c) determines that insertion of a prefetch operation between said memory operation and said address forming operation would increase the speed of execution of said program.

2. The method of claim 1 wherein said locating an address forming operation associated with said memory operation within said program code is carried out using a backward dataflow pass.

3. The method of claim 1 wherein said determining if insertion of a prefetch operation between said memory operation and said address forming operation would increase the speed of execution of said program further comprises:
   (a) calculating a distance between said memory operation and said address forming operation; and
   (b) determining if said distance is sufficient to allow a prefetch operation inserted immediately after said address forming operation to complete before the memory operation is carried out.

4. The method of claim 1 wherein said determining if insertion of a prefetch operation between said memory operation and said address forming operation would increase the speed of execution of said program further comprises:
   (a) calculating a distance between said memory operation and said address forming operation; and
   (b) determining if said distance is sufficient to allow a prefetch operation inserted immediately after said address forming operation to begin before the memory operation is carried out.

5. The method of claim 1 wherein said determining if insertion of a prefetch operation between said memory operation and said address forming operation would increase the speed of execution of said program further comprises:
   (a) calculating a distance between said memory operation and said address forming operation; and
   (b) determining if said distance is sufficient to allow a prefetch operation inserted immediately after said address forming operation to increase the speed of execution of said program.

6. The method of claim 1 wherein said prefetch operation is inserted immediately after said address forming operation.

7. The method of claim 1 wherein said prefetch operation is inserted at a distance from the memory operation so that the prefetch operation is completed just before the memory operation is carried out.

8. A dataflow prefetch component apparatus for use in compiling a program code into a program comprising:
   (a) a memory operation locate routine configured to locate a memory operation within said program code;
   (b) an address forming operation locate routine configured to locate an address forming code sequence within said program code;
   (c) a dataflow analysis routine configured to determine if a prefetch operation inserted between said memory operation and said address forming code sequence would increase the speed of execution of said program; and
   (d) a prefetch insert routine configured to insert a prefetch operation between said memory operation and said address forming code sequence.

9. The dataflow prefetch component apparatus of claim 8, wherein said address forming operation locate routine is further configured to carry out a backward dataflow pass.

10. The dataflow prefetch component apparatus of claim 8, wherein said data flow analysis routine is further configured to calculate a distance between said memory operation and said address forming operation, and to determine if said distance is sufficient to allow a prefetch instruction inserted immediately after said address forming operation to increase the speed of execution of the program.

11. A program storage device readable by a machine, tangibly embodying a program of instructions executable by the machine to perform a method for inserting prefetch operations during compilation of a program code into a program, said method comprising:
   (a) locating a memory operation within said program code;
   (b) locating an address forming operation associated with said memory operation within said program code;
   (c) determining if insertion of a prefetch operation between said memory operation and said address forming operation would increase the speed of execution of said program; and
   (d) inserting a prefetch operation between said memory operation and said address forming operation when said act (c) determines that insertion of a prefetch operation between said memory operation and said address forming operation would increase the speed of execution of said program.

12. The program storage device of claim 11 wherein said locating an address forming operation associated with said memory operation within said program code is carried out using a backward dataflow pass.

13. The program storage device of claim 11 wherein said determining if insertion of a prefetch operation between said memory operation and said address forming operation would increase the speed of execution of said program further comprises:

(a) calculating a distance between said memory operation and said address forming operation; and (b) determining if said distance is sufficient to allow a prefetch operation inserted immediately after said address forming operation to complete before the memory operation is carried out.

14. The program storage device of claim 11 wherein said determining if insertion of a prefetch operation between said memory operation and said address forming operation would increase the speed of execution of said program further comprises:

(a) calculating a distance between said memory operation and said address forming operation; and (b) determining if said distance is sufficient to allow a prefetch operation inserted immediately after said address forming operation to begin before the memory operation is carried out.

15. The program storage device of claim 11 wherein said determining if insertion of a prefetch operation between said memory operation and said address forming operation would increase the speed of execution of said program further comprises:

(a) calculating a distance between said memory operation and said address forming operation; and (b) determining if said distance is sufficient to allow a prefetch operation inserted immediately after said address forming operation to increase the speed of execution of said program.

16. The method of claim 11 wherein said prefetch operation is inserted immediately after said address forming operation.

17. The method of claim 11 wherein said prefetch operation is inserted at a distance from the memory operation so that the prefetch operation is completed just before the memory operation is carried out.

18. A dataflow prefetch component apparatus for use in compiling a program code into a program comprising:

(a) means for locating a memory operation within said program code;

(b) means for locating an address forming operation associated with said memory operation within said program code;

(c) means for determining if insertion of a prefetch operation between said memory operation and said address forming operation would increase the speed of execution of said program; and (d) means for inserting a prefetch operation between said memory operation and said address forming operation when said determining means determines that insertion of a prefetch operation between said memory operation and said address forming operation would increase the speed of execution of said program.

19. The dataflow prefetch component apparatus of claim 18 wherein said means for locating an address forming operation further comprises means for carrying out a backward dataflow pass.

* * * * *